A. E. S. CRAIG.
DYNAMOMETER.
APPLICATION FILED NOV. 2, 1908.

943,391.

Patented Dec. 14, 1909.
4 SHEETS—SHEET 1.

WITNESSES:

INVENTOR
Arthur Edward Stewart Craig
BY
ATTORNEYS.

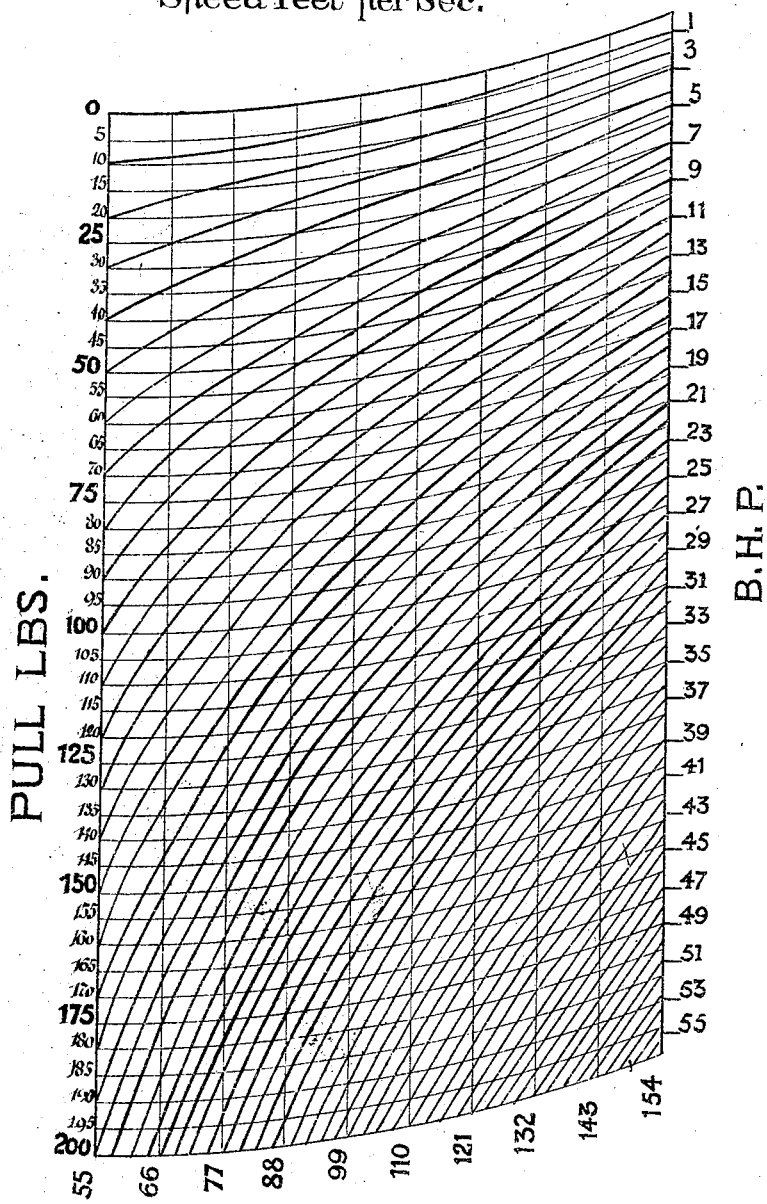

A. E. S. CRAIG.
DYNAMOMETER.
APPLICATION FILED NOV. 2, 1908.
943,391.
Patented Dec. 14, 1909.
4 SHEETS—SHEET 3.
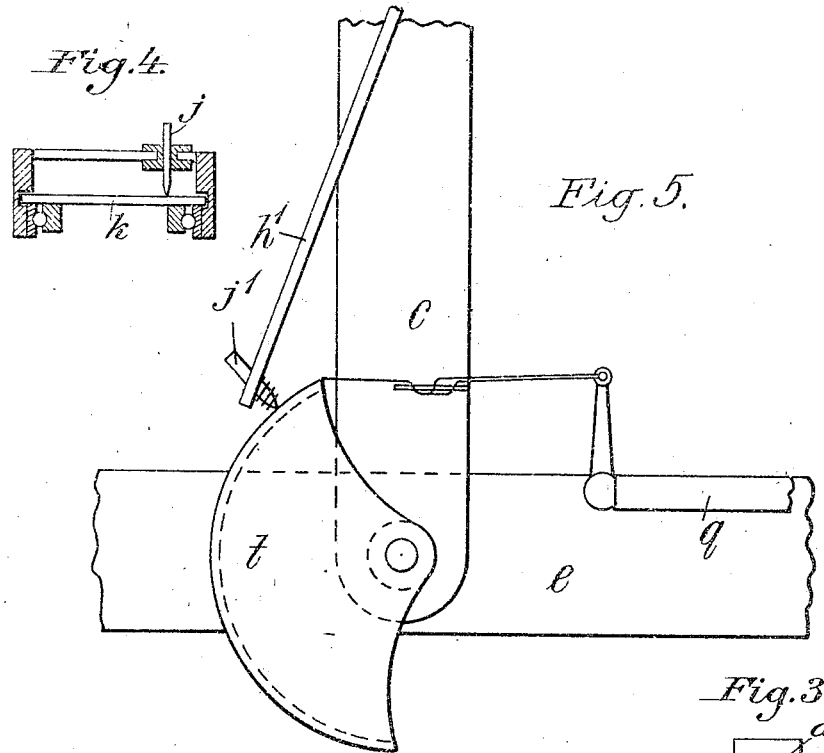
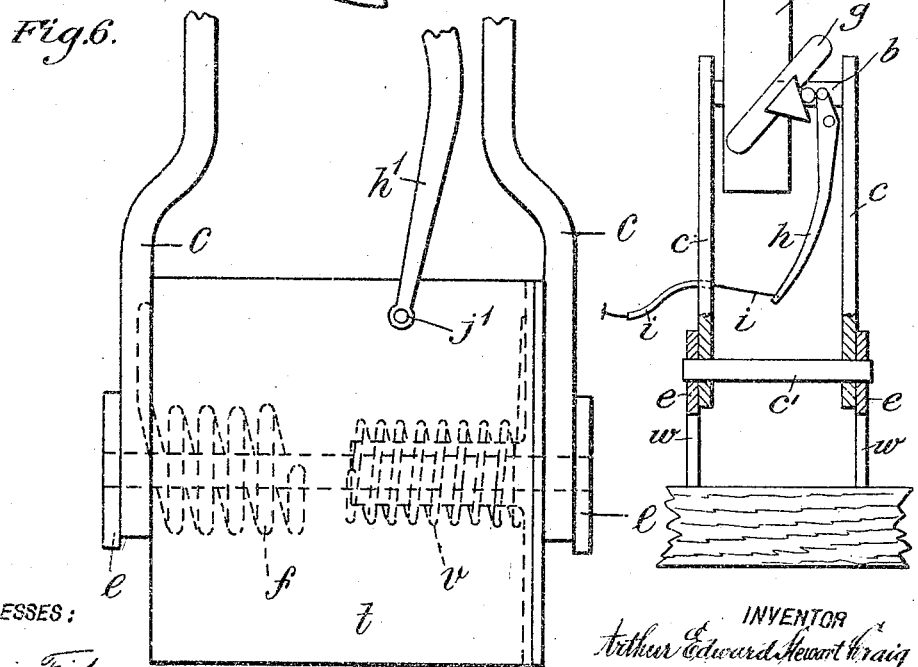
WITNESSES:
INVENTOR
Arthur Edward Stewart Craig
BY Goepel & Goepel
ATTORNEYS.

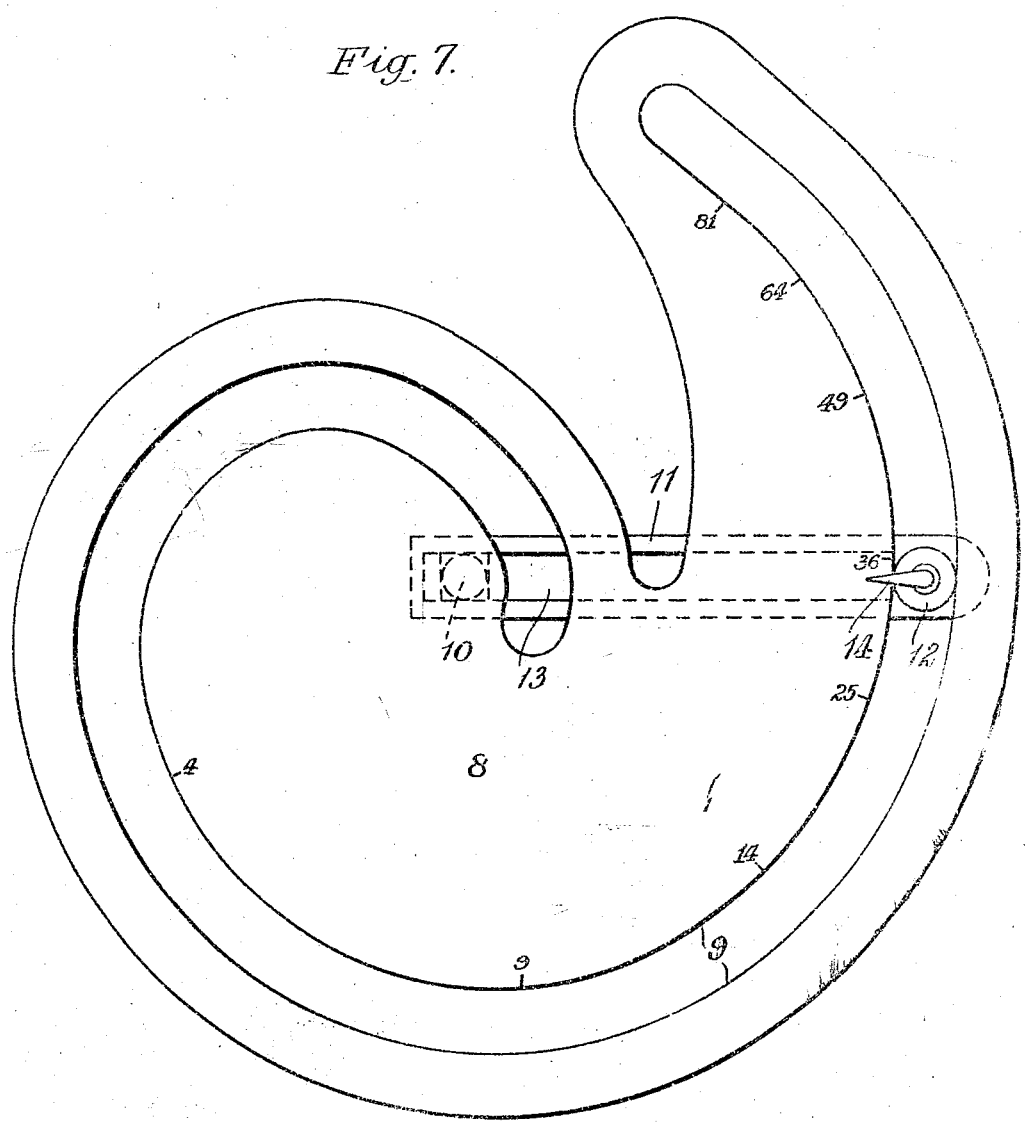

UNITED STATES PATENT OFFICE.

ARTHUR EDWARD STEWART CRAIG, OF WEST EALING, ENGLAND.

DYNAMOMETER.

943,391.  Specification of Letters Patent.  Patented Dec. 14, 1909.

Application filed November 2, 1908. Serial No. 460,745.

*To all whom it may concern:*

Be it known that I, ARTHUR EDWARD STEWART CRAIG, a subject of the King of England, residing in West Ealing, in the county of Middlesex and Kingdom of England, have invented certain new and useful Improvements in Dynamometers, of which the following is a specification.

My invention relates to improvements in dynamometers and has for its object to provide a dynamometer which shall indicate brake horse power or its equivalent without calculation on the part of the operator, and is intended more especially to be made in a convenient form for testing prime movers by applying the apparatus to the periphery of the flywheels or pulleys of same.

In order that my invention may be clearly understood I have shown in the accompanying drawings a convenient form of apparatus, in which—

Figure 1:
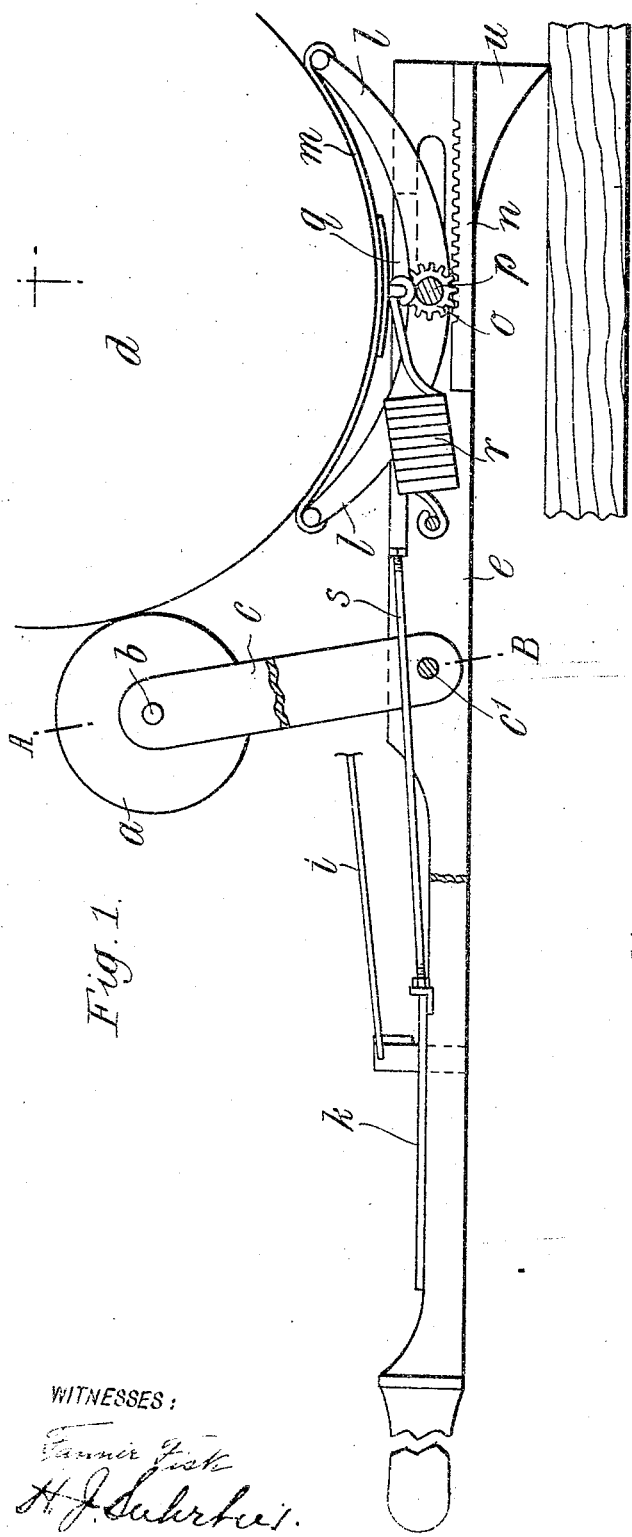
Figure 2:
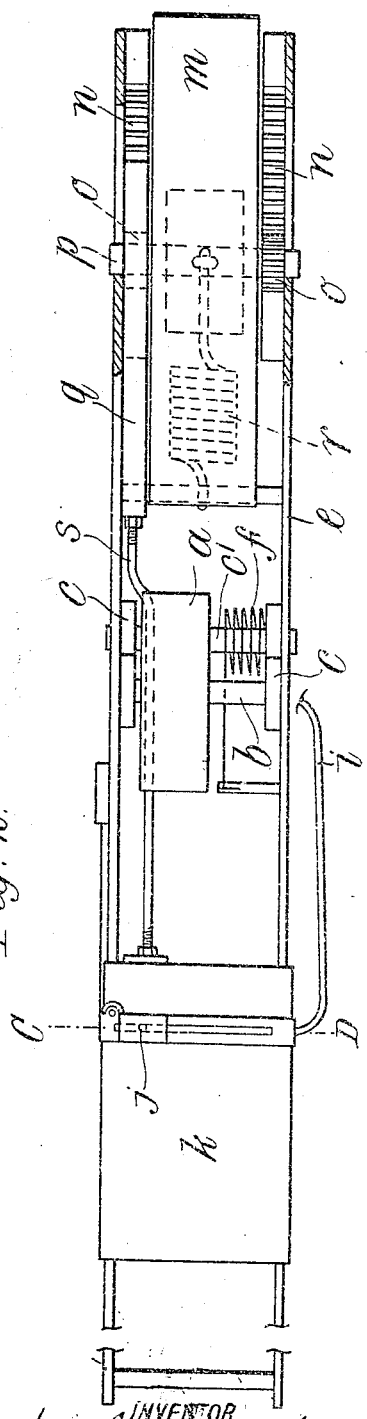

Figure 1 is a side elevation partly in section of the apparatus, Fig. 2 is a plan view thereof, Fig. 2ª is a view of the chart or dial. Fig. 3 is a part transverse section on the line A—B, Fig. 1, and Fig. 4 is a part transverse section on the line C—D, Fig. 2. Figs. 5 and 6 show a modification of the scale and pointer in side and end elevation respectively, and Fig. 7 shows a further alternative form of scale and pointer.

According to my invention, and referring first to Figs. 1 to 4 of the drawings, I mount one or more wheels, disks or rollers $a$ on a shaft or spindle $b$ arranged in such a manner on a suitable arm or arms $c$ that the shaft or spindle $b$ will revolve when the one or more wheels, disks or rollers $a$ is or are applied in frictional contact to the periphery of the flywheel or pulley $d$ of the engine or other machine of which it is required to find the brake horse power developed. Hence the revolutions of the shaft or spindle $b$ will vary relatively to the peripheral speed of the flywheel or pulley $d$ against which it is held. The shaft or spindle $b$ carrying the friction wheel or disk $a$ is mounted on the swinging arm or arms $c$ which is or are attached or pivoted at $c^1$ to a main lever or frame $e$ and the said arm or arms $c$ is or are preferably kept against the flywheel $d$ by an adjustable spring $f$ (Fig. 2). This shaft or spindle $b$ is utilized to drive a suitable device which will indicate proportionate variations of speed, as for instance a centrifugal action sensitive governor $g$, shown diagrammatically in Fig. 3. This device actuates in a varying degree according to speed a pivoted arm $h$ which may be attached at its opposite extremity to a Bowden wire $i$, such wire passing if desired through the swinging arm $c$ and being carried to the pointer $j$ which travels across and above the dial or scale $k$ in suitable guides. It will be seen that with this device it is not necessary to know the revolutions per minute as has been previously ascertained, the peripheral speed in feet per second being alone transmitted. Also mounted on the main lever $e$ is a cradle or frame that is fixed in such a manner as to be capable of a limited movement as for instance by being attached to swinging links $l$ at either end, and this cradle or frame carries a flexible friction band $m$ that is pressed by the action of the lever $e$ when the dynamometer is used against the periphery of the flywheel or pulley $d$ of the engine or other machine to be tested. The limited movement may be transmitted by a rack and pinion arrangement; the lower rack $n$ is fixed and the pinions $o$ on the cradle shaft $p$ mesh therewith, the upper rack $q$ being movable and also engaging with the pinion $o$ (Fig. 2). The cradle is arranged so that the flexible friction band $m$ adjusts itself automatically to suit the periphery of any wheel within the limits of the apparatus. The cradle in meshing in the lower racks $n$ and working along the same doubles the movement imparted to it in pulling the upper rack $q$, that is to say, the movement of the upper rack $q$ is twice that of the cradle on the lower rack $n$. To any convenient portion of the friction band, or cradle or frame, such as the underside of the flexible band $m$ is attached an instrument such as a spring balance or a calibrated tension spring $r$ that will indicate variations in peripheral pull. The upper rack $q$ is connected by suitable means such as a rod $s$ to the scale or dial $k$. At or about any convenient portion of the main lever $e$ is arranged a scale or dial such as $k$ calibrated in such a manner that the combined variations of peripheral speed and pull obtained by such devices as hereinbefore described are indicated direct as resultant brake horse power or whatever other equivalent term may be used. A chart is arranged on this scale in which the vertical lines will give the pull in pounds and the horizontal lines the speed in feet per second, as shown in Fig. 2ª. The dial $k$ moving in one direction according to the pull and the pointer moving across the dial according to the speed will plot out a suitable curve. By referring to the table on the side of the chart giving the resultant horse power of a large series of the factors,— speed and pull, by following the chart lines vertically and horizontally at any point where they are intersected by the diagram marked by the pencil and reading the figures on the edge of the chart the nearest horse power can be found at a glance. Or the horse power can be printed on the face of the chart at intersecting points in small figures.

Figs. 5 and 6 show a form of scale in which the chart is held on a drum or cylinder $t$, or a segment of same, the pull giving a rotary motion to the drum $t$ through rack $q$ as before. The drum is so arranged in relation to the arm $h^1$ actuated by the speed indicating mechanism as before that the arm acts as a pointer $j^1$ and moves across the face of the chart thus giving the required readings. $v$ is a spring to pull the scale holder back. Therefore the two indicating devices controlled respectively by the speed and the pull of the engine or other machine to be tested work simultaneously but in a multiplying manner with regard to one another, so that by reading off suitably calibrated figures on the scale opposite a hand or pointer or a mark on a second scale the direct reading of brake horse power or its equivalent may be obtained without calculation.

Fig. 7 is another form of dial for giving the readings where the scale and pointer move in opposite and multiplying manner. The calibration is here in accordance with logarithmical progression, the scale being rotated through rack and pinion or pulley or other equivalent device by the pulling mechanism, while the hand or pointer is caused to follow the counter of a slot and is moved in an opposite direction by the speed indicating mechanism. The slot is here of spiral form instead of circular to prevent the higher readings being unduly crowded. In this figure, 8 is the dial slotted as at 9 and calibrated on one edge of the slot. When circular motion is given to the shaft 10 (with square attached) by means of the device indicating the speed by suitable mechanism, it moves a slotted arm 11 with roller 12 working in slot 9. At the same time the slot 13 in the arm 11 moves over the square on shaft 10. An opposite movement is given to the dial by means of the device indicating the pull. 14 is the pointer. The calibrations are in brake horse power being the resultant of pull in pounds $\times$ peripheral speed in feet per second $\div$ 550.

The lever $e$ on which the speed and pull indicating devices as hereinafter described are mounted and arranged may be of any convenient length, shape and material and is preferably inserted under the flywheel or pulley $d$ of the engine or other machine to be tested. It is arranged as a lever of the second kind and has preferably its fulcrum at or about the end that is passed underneath the flywheel or pulley as shown at $w$ so that a pulling up movement is required at the actuating end when the test is to be made and thus normally the apparatus will lie clear and therefore without friction until it is raised into action.

It will be understood that the devices that indicate the speed and pull and are arranged to work in a multiplying or compound manner in respect to one another so as to show the resultant of both may be applied to any other convenient form of dynamometer in which it is desirable to indicate the brake horse power or its equivalent of any engine or other machine directly.

What I claim as my invention and desire to secure by Letters Patent of the United States is:—

1. A dynamometer of the absorption type comprising, in combination, means for ascertaining the tangential pull of the flywheel or pulley at the periphery, a single scale or dial, and means for ascertaining the peripheral speed of the said flywheel or pulley, means for conveying said indications of pull and speed to said scale or dial, said scale or dial having means for ascertaining from said scale or dial without calculation on the part of the operator the brake horse-power of the machine being tested.

2. A dynamometer of the absorption type comprising, in combination, a lever, a cradle located thereon and capable of a limited movement, a flexible friction band on said cradle, said cradle automatically embracing a segment of the wheel or pulley when pressed in contact therewith by said lever, means connected to said cradle to ascertain the tangential pull of the flywheel or pulley at the periphery, means for ascertaining the peripheral speed of the said flywheel or pulley, a single scale or dial, and means for conveying said indications of pull and speed to said scale or dial, said scale or dial having means for ascertaining from said scale or dial without calculation on the part of the operator the brake horse-power of the machine being tested.

3. A dynamometer of the absorption type comprising, in combination, a lever, means for ascertaining the tangential pull of the flywheel or pulley at the periphery, spring-controlled arms pivoted to said lever, a friction wheel carried by said arms adapted to contact with the periphery of the said flywheel or pulley, speed-indicating apparatus actuated by the friction wheel, a single scale or dial, and means for conveying said indications of pull and speed to said scale or dial, said scale or dial having means for ascertaining from said scale or dial without calculation on the part of the operator the brake horse-power of the machine being tested.

4. A dynamometer of the absorption type comprising, in combination, a lever of the second order normally lying clear and adapted to be pulled up at the actuated end into contact with a flywheel or pulley, means for ascertaining the tangential pull of said flywheel or pulley at the periphery, means for ascertaining the peripheral speed of the said flywheel or pulley, a single scale or dial, and means for conveying said indications of pull and speed to said scale or dial, said scale or dial having means for ascertaining from said scale or dial without calculation on the part of the operator the brake horse-power of the machine being tested.

5. A dynamometer of the absorption type comprising, in combination, means for ascertaining the tangential pull of a flywheel or pulley at the periphery, a single scale or dial, and means for ascertaining the peripheral speed of the said flywheel or pulley, means for conveying said indications of pull and speed to said scale or dial, said scale or dial having means for enabling the resultant horse-power of the machine to be seen at a glance without calculation.

In testimony, that I claim the foregoing as my invention, I have signed my name in presence of two subscribing witnesses.

ARTHUR EDWARD STEWART CRAIG.

Witnesses:
 J. S. ARMER,
 F. BLAKEY.